No. 872,457. PATENTED DEC. 3, 1907.
H. RUSSEL.
MOVABLE STAIRWAY.
APPLICATION FILED FEB. 15, 1902.
3 SHEETS—SHEET 1.
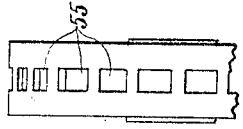
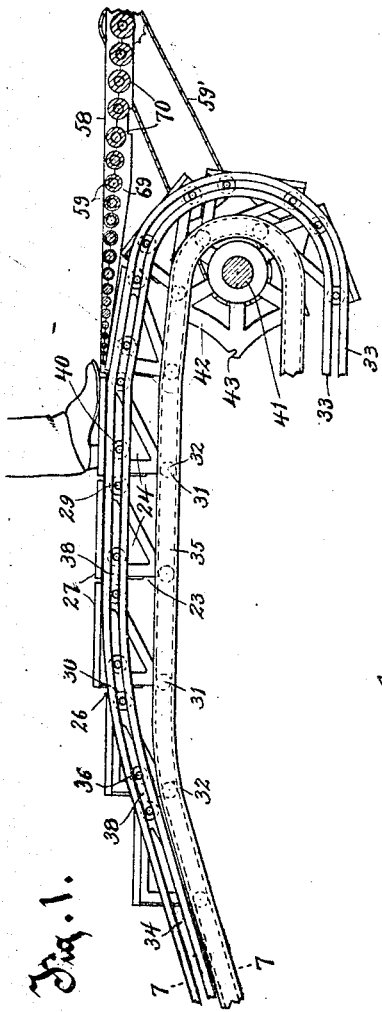
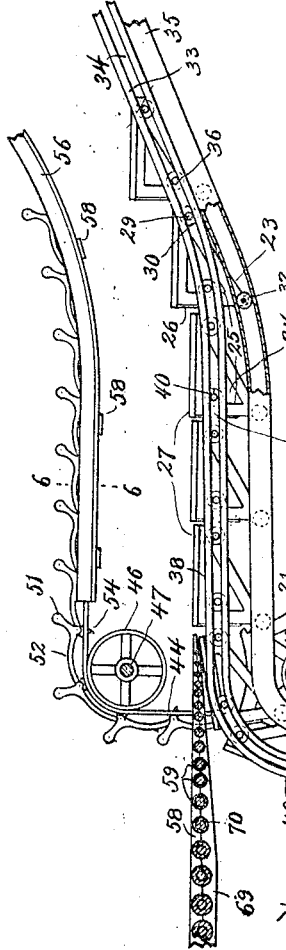
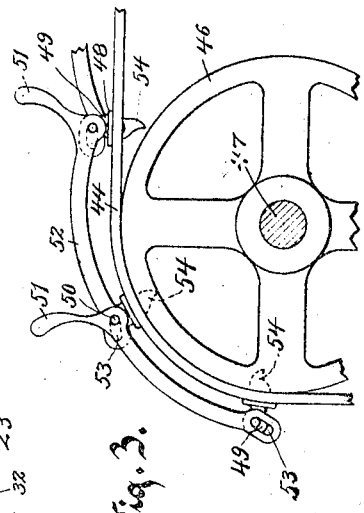
Witnesses.
C. H. Keeney.
Anna V. Faust.
Inventor.
Howland Russel.
By Benedick & Morsell
Attorneys.

No. 872,457. PATENTED DEC. 3, 1907.
H. RUSSEL.
MOVABLE STAIRWAY.
APPLICATION FILED FEB. 15, 1902.
3 SHEETS—SHEET 2.
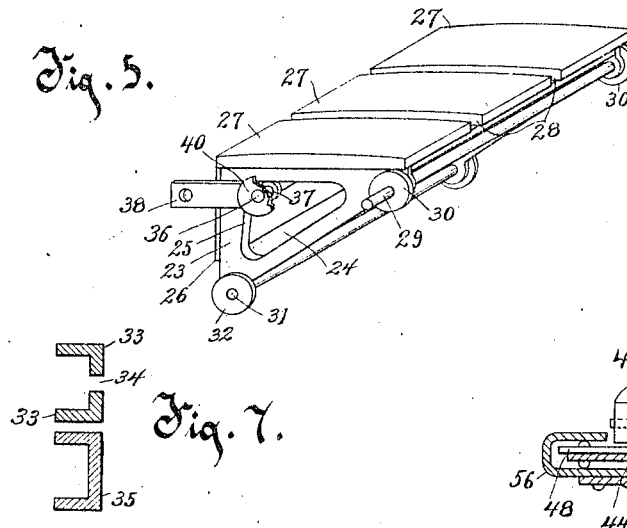
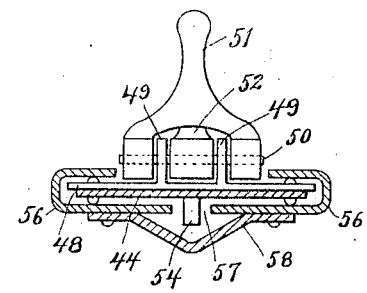
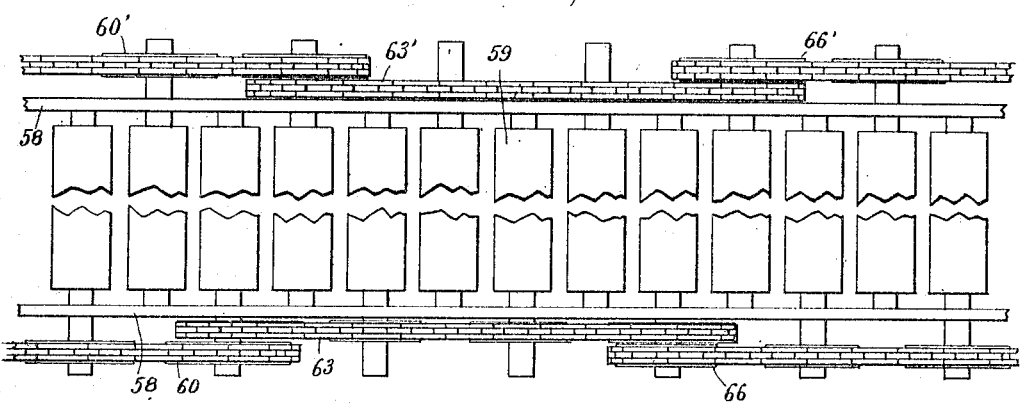
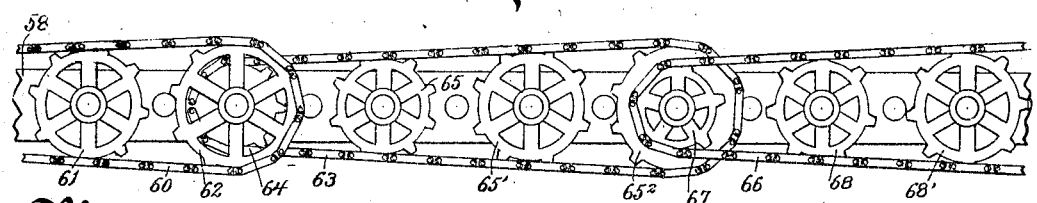
Witnesses.
Inventor.
Howland Russel.
By Benedict & Morsell
Attorneys.

No. 872,457. PATENTED DEC. 3, 1907.
H. RUSSEL.
MOVABLE STAIRWAY.
APPLICATION FILED FEB. 15, 1902.
3 SHEETS—SHEET 3.
Fig. 10.
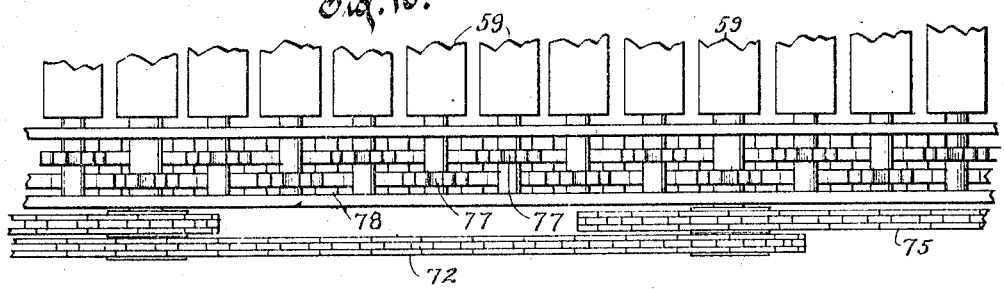
Fig. 11.
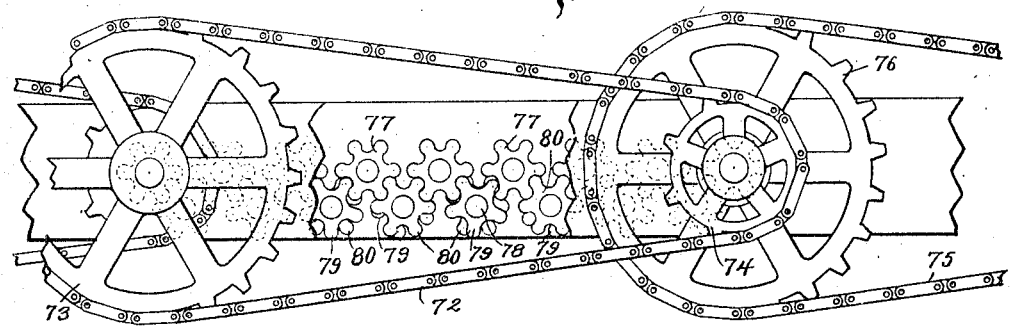
Fig. 12.
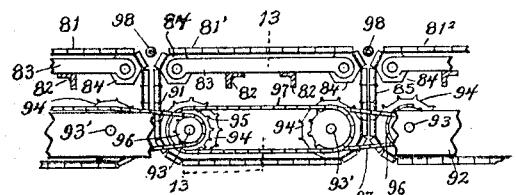
Fig. 13.
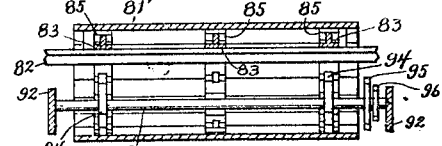
Fig. 16.
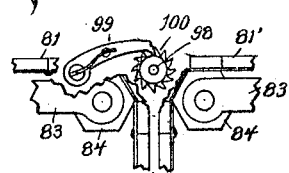
Fig. 14.
Fig. 15.
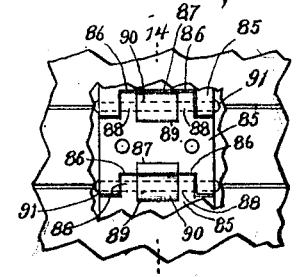
Fig. 17.
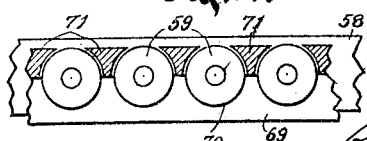
Witnesses.
C. H. Kenney.
Anna O. Faust.
Inventor.
Howland Russel.
By Benedict & Morsell
Attorneys.

UNITED STATES PATENT OFFICE.

HOWLAND RUSSEL, OF MILWAUKEE, WISCONSIN.

MOVABLE STAIRWAY.

No. 872,457.    Specification of Letters Patent.    Patented Dec. 3, 1907.

Application filed February 15, 1902. Serial No. 94,183.

*To all whom it may concern:*

Be it known that I, HOWLAND RUSSEL, residing at Milwaukee, in the county of Milwaukee and State of Wisconsin, have invented a new and useful Improvement in Movable Stairways, of which the following is a description, reference being had to the accompanying drawings, which are a part of this specification.

My invention has relation to improvements in movable stairways of that class in which a series of steps connected in the form of an endless belt is employed and designed to carry passengers from one elevation to another.

One of the primary objects of the invention is to provide an improved means for connecting the several steps through the medium of links so arranged that the axes of said links will always coincide with the line of strain and that the horizontal distance from the face of the riser of one step to the face of the riser of the next step will always remain the same whether the steps be moving on the level or at an angle.

A further object is to provide improved forms of landings leading to and from the steps at the different elevations, with means for moving the upper surface of each landing in the same direction as the moving stairs, and at a rate of speed gradually decreasing as the distance from the stairway increases.

A further object resides in the provision of a construction whereby tracks or channels supporting the bearing wheels of the steps are set parallel, converging, and diverging, and so arranged that the steps may gradually pass from the level to any pitch desired and again to the level, and so curved as to bring every portion of the top of the tread the same distance from that portion of the movable landing which is nearest to the moving stairway, as the steps pass under the same.

With the above primary, and other incidental, objects in view, the invention consists of the devices and parts, or their equivalents, as hereinafter set forth.

In the accompanying drawings, Figure 1 is a side elevation of a fragment of the upper portion of the stairway, also showing a section through the moving landing leading therefrom. Fig. 2 is a fragment of the lower portion of the movable stairway, also showing a section through the movable landing leading thereto, and furthermore showing a fragment of the movable hand rail. Fig. 3 is a view showing a fragment of the movable hand rail on an enlarged scale, and showing one of the pulleys around which said hand rail passes. Fig. 4 is a view of the periphery of one of the pulleys around which the movable hand rail extends. Fig. 5 is a perspective view of one of the steps. Fig. 6 is a section, on an enlarged scale, on the line 6—6 of Fig. 2. Fig. 7 is a section through the line 7—7 of Fig. 1. Fig. 8 is a plan view of one form of movable landing, the intermediate strips 69 being omitted. Fig. 9 is a side elevation of Fig. 8. Fig. 10 is a plan view of a modified form of movable landing. Fig. 11 is a side elevation of Fig. 10. Fig. 12 is a side elevation of still another modified form of movable landing. Fig. 13 is a cross section on the line 13—13 of Fig. 12. Fig. 14 is a section on the line 14—14 of Fig. 15, Fig. 15 is a plan of the hinge connection between the several slats forming the endless belt of the Fig. 12 form of construction, Fig. 16 is a detail showing means for preventing backward rotation of roller 98; and Fig 17 is a view of the movable landing of the Figs. 8 to 11 form of construction, showing the filling blocks 71.

Referring to the drawings, the numeral 16 indicates a shaft, and 17 another shaft driven therefrom in any desirable manner, preferably by means of a sprocket chain 18 passing around a sprocket wheel 19 on the shaft 16, and around a similar wheel 20 on the shaft 17. Mounted fast on opposite ends of the shaft 16 are wheels 21, 21 the periphery of each wheel having arranged therearound, at equi-distances apart, notched or recessed projections 22, the portions of the periphery between said projections being preferably curved inwardly.

The stairway consists of a series of steps, pivotally connected together to form an endless belt. Each step comprises the end frames 23, preferably of substantially triangular form, and each of these frames is provided with an opening 24, the rear bordering edge 25 of said opening being on a line inclined to the vertical, and preferably somewhat curved. The front of each step between the end frames thereof may be covered by a solid front piece 26, and the top of the step may also be covered by a solid piece of tread, although I prefer that such top portion be made up of a series of separate pieces 27, with spaces 28 between the opposed edges thereof, for a purpose hereinafter to be referred to. At the rear and upper portion of each step is mounted a transverse shaft 29, and on this shaft are mounted wheels 30, 30, the ends of the shaft projecting slightly beyond said wheels. At the front and lower portion of each step is mounted another transverse shaft 31, and on the opposite ends of this shaft are wheels 32, 32. The wheels 30, 30 are adapted to travel on an endless track-way, and for the purposes of my invention, I prefer that the rails of this track-way shall be composed of angle irons 33, 33 (most clearly shown in Fig. 7) with the vertical portions of said angle irons spaced apart a slight distance to form a longitudinal slot 34. Through the slots so formed the extended ends of the shaft 29 pass, the wheels 30 being disposed between the horizontal portions of said angle irons. The wheels 32, 32 are also adapted to travel on an endless track-way, and each rail of this track-way preferably consists of an angle iron 35 between the horizontal portions of which each wheel 32 is disposed.

An intermediate shaft 36 has its opposite ends passing into the openings 24, and said ends carry thereon antifriction rollers 37, 37, which are adapted to bear against the rear edges 25 of the openings 24. Links 38 are loosely mounted on the shaft 36 of each step, and the opposite end of each of said links is loosely mounted on the shaft 29. By this arrangement the axis of each link will always co-incide with the line of strain, and that the horizontal distance from the face of the riser of one step to the face of the riser of the next step will always remain the same whether the steps be moving on the level or at any pitch. Also mounted on the shaft 36 are wheels 40, 40 which travel on the upper track-way formed by the rails 33.

At the upper landing or story there is a shaft 41, and on this shaft are wheels 42, 42 similar in all respects to the wheels 21, 21 on the shaft 16 of the lower landing or story, that is to say, each wheel 42 is provided with peripheral notched or recessed projections 43, with the portions of the peripheries of the wheels between said projections preferably curved inwardly. The notches or recesses of the projections 43 are adapted to be engaged by the extended ends of the shafts 29, in the same manner that the notches or peripheries of the projections 22 of the wheels 21 are adapted to be engaged by said shafts. The steps linked together in the form of an endless belt pass around the wheels 21 of the lower landing, and also around the wheels 42 of the upper landing, and the several rails of the track-ways also curve around at the landing so as to be endless in form. The driving power is preferably connected up to the shaft 41, although of course it could be arranged to positively rotate the shaft 16, or both shafts 16 & 41 could be positively rotated by any desirable means. In connection with my improved stairway I also employ an endless movable hand rail, composed of an endless flexible belt 44. At the lower landing this belt passes around a pulley 45 mounted on the driven shaft 17, and then extends upwardly and around an idle pulley 46 above the landing, said pulley being mounted on a shaft 47. Pulleys similar to pulleys 45 & 46 are of course provided at the upper story or elevation. Secured at desired distances apart to the flexible belt 44 are plates 48. Each plate has projecting therefrom parallel arms 49, 49 forming bearings for a transverse pin 50. The opposite ends of each of these pins project laterally beyond the arms 49, and on said projecting ends are mounted the furcate extremities of a handle 51, the said handle being formed at one end of a curved bar 52. The opposite end of each curved bar is provided with an elongated slot 53, and through this slot extends the pin 50. From the under side of the endless belt 44 project rigid dogs 54, which dogs are adapted to engage with recesses 55 in the peripheries of the several pulleys 45 & 46.

A sheathing or casing for the movable hand rail is preferably employed, and this sheathing not only serves as a protection to the hand rail, but also serves as a means for holding the handles 51 rigid, so that a person may grasp the same and thereby secure a firm or unyielding hold. This sheathing consists of two similar half sections 56, 56, the under portions thereof extending beneath the endless flexible belt 44, and the opposed edges of said under portions being separated to form a longitudinal slot 57, said slot being so located as to permit the dogs 54 to extend therethrough and engage the recesses 55 of the pulleys 45 & 46. The two sections of the sheathing are held together by means of plates 58 arranged at intervals apart beneath said sheathing and secured to the respective sections thereof. The sections of the sheathing are extended upwardly adjacent to but not in contact with the side edges of the endless belt 44, and thence curve inwardly over and adjacent to but not in contact with the upper side of the endless belt. By this construction of sheathing it will be seen that, in the passage of the hand rail through the sheathing, the endless belt of the rail can only move to the slightest extent laterally in either direction, owing to contact with the sides of the sections of the sheathing, and can also only move to the slightest extent upwardly, owing to contact with the inwardly extending upper portions of the sections of said sheathing, and hence the handles 51 are thereby held practically rigid to provide a firm grasp for a person standing on the moving stairway. The sheathing, of course, is omitted at the points where the pulleys 45 & 46 are located, so as not to interfere with the passage of the hand rail around the pulleys. The endless hand rail is caused to travel by reason of the engagement of the peripheral recesses of the pulley 45 which is mounted on the driven shaft 17 with the dogs 54.

In the operation of my invention as thus far explained, rotation is given to the drive shaft by any desired means. Said rotation is of course transferred to the driven shafts 17. The rotation of the drive shaft causes the wheels 42 to be rotated, and as said wheels are thus rotated the notches or recesses of the projections 43 thereof and also the notches or recesses of the projections 22 of the wheels 21 engage the transverse shafts 29 of the successive steps, and consequently the endless stairway is caused to travel. The rotation of the driven shafts 17 causes the hand rail to travel, the connection being such that said stairway and hand rail move at the same or substantially the same speed. A person steps on to one of the steps from the landing, and of course is carried by the moving stairway up to the upper landing. The tracks or channels supporting the bearing wheels of the stairway are set parallel and converging and diverging, and are so arranged that the steps may gradually pass from the level to any pitch desired, and again to the level. The steps are also so connected that they will preserve their horizontality, even after they pass off level portions of the track on to inclined portions thereof, and this by reason of the fact that the anti-friction rollers 37 bear against the rear bordering edges 25 of the openings 24 of the end pieces of the steps, whereby the front of said steps are permitted to have an up and down movement, with the front edges of the openings 24 working against the rollers 25. The axes of the links 38 will therefore always coincide with the line of strain, and the horizontal distance from the face of the riser of one step to the face of the riser of the next step will always remain the same, whether the steps be moving on the level or at any angle. This is an important feature, inasmuch as thereby the width of a step is never narrowed, and consequently the entire width of the upper surface of each step is always capable of being utilized by a person standing thereon.

It will be understood of course that two or more moving stairways such as described may be employed, one or more ascending, and an equal number descending, and that the axles of the wheels are so geared or otherwise connected that the load on the descending series will help lift the load on the ascending series.

My invention furthermore contemplates the provision of a landing or approach leading to the moving stairway, and a similar landing leading from said stairway, each landing adapted to move in the same direction as the moving stairs, at or near the same rate of speed as that of said stairs at points where the stairs connect with the landings, the speed, however, gradually decreasing as the distance of the landing from the stairs increases. Referring to this mechanism, Figs. 1, 8 & 9 indicate one form thereof. In these figures the numerals 58, 58 indicate two outer side strips which form bearings for the axes of transverse rollers 59. These rollers are of varying size, the one of the smallest diameter being at the point where the landing meets the stairway, and the succeeding rollers gradually increasing in diameter in a direction outwardly from the stairway.

It will be understood that positive rotation is imparted to one of the rollers by any desired means, as for instance, by a suitable connection from the drive shaft to the axis of one of the rollers, as by means of a sprocket chain 59' passing around a sprocket wheel on the drive shaft and around a similar wheel on the axis of the positively driven roller. From this positively driven roller the rotation is transferred to all the other several rollers of the landing, and this rotation is such that the rollers will be turned at a more or less gradually decreasing rate of speed as the distance from the stairs increases. This may be accomplished in a variety of different ways, and in Figs. 8 & 9 I show one means for accomplishing the same, consisting of a system of sprocket chains and of sprockets of varying size, so as to give the rollers a more or less gradually decreasing rate of speed as the distance from the stairs increases. The rollers I divide up into different groups or series, and rotate the initial roller of one series by a sprocket chain connection with the terminal roller of the preceding series, while the alternating intermediate rollers between the initial and terminal rollers are rotated by the sprocket chains on opposite sides, the chain on one side engaging sprocket wheels on the extended journals of alternating rollers, and the chain on the opposite side engaging sprocket wheels on the extended journals of alternating rollers on that side. Referring specifically to this mechanism, and beginning with the rollers of the first group at the left hand of Fig. 8, the sprocket chains which actuate these rollers are indicated by the numerals 60, 60'. The chain 60 engages a sprocket wheel 61 on an alternating intermediate roller on that side, and thence passes finally around a sprocket wheel 62. The sprocket chain 60' engages a sprocket wheel similar to 61 on the extended journal of every alternating roller on the other side, and finally around a sprocket wheel similar to 62, but on the extended journal of the roller one step farther removed. The next chain 63 extends around a small sprocket wheel 64 on the axis of the roller on which the sprocket wheel 62 is located, and thence engages alternating intermediate sprocket wheels 65, 65', and finally passes around a sprocket wheel 65² on the next succeeding alternate roller. The corresponding sprocket chain 63' on the other side engages sprocket wheels similar to 65 and 65' on the axes of alternating rollers on that side, and finally passes around a sprocket wheel similar to 65² but on the extended journal of a roller one step removed from the roller on the axis of which the sprocket wheel 65² is located. The next succeeding chain 66 on one side passes around a small sprocket wheel 67 on the axis of the roller carrying the sprocket wheel 65², and thence engages intermediate sprocket wheels 68, 68', and finally passes around a sprocket wheel on the extended end of the journal of the next succeeding alternating roller (not shown); and the similar chain 66' on the opposite side passes around a sprocket wheel similar to 67 on the extended journal of the roller one step removed from the journal of the roller carrying the sprocket wheel 67, and thence engages the intermediate sprocket wheels on that side corresponding to but alternating with the sprocket wheels 68, 68' on the opposite side, and finally passes around a sprocket wheel of the next succeeding alternating roller (not shown). It will be noticed that in each group of rollers on each side the sprocket wheel which a chain initially engages is the smallest in diameter, and the diameter increases progressively with the next succeeding wheels, the terminal wheel which a chain passes around being the largest in diameter. A person stepping on to the moving landing or approach will move along on the slowly rotating rollers, and the speed of rotation will gradually increase towards the stairway, the final roller rotating at a speed substantially equal to the speed of movement of the stairway, and a person upon leaving the stairway will pass on to a roller which is revolving at a rate of speed substantially equal to the speed of the moving stairway, and as he steps along the speed of rotation of the succeeding rollers gradually decreases the farther away the person gets from the stairway, so that the final roller located at the terminus of the movable landing will be rotating at a minimum rate of speed, so that the person can readily step off on to the stationary landing without danger of accident.

I prefer to provide intermediate of the outer side bars 58 of the movable landing, slats 69, said slats being set edgewise, and being supported by bars or brackets (not shown). These slats are provided in their upper edges with recesses 70 in which the rollers are seated. The under edges of the slats are beveled towards the stairway, as clearly shown in Fig. 1, so that said stairway can readily pass therebeneath, the said beveled under edges passing into the slots 28 in the top of each step as a step passes beneath the moving landing. The rollers 59 are made of gradually decreasing diameter near the stairway so as to permit the stairway to readily pass around and beneath the landing. The upper edges of these slats 69 form a means for supporting transverse blocks 71, (see Fig. 17), which blocks substantially fill the spaces between the rollers, and hence act as filling blocks to prevent a person's toe from entering the space which would otherwise be left between two of the rollers. It will be understood that, in practice, in order to secure the proper reduction of speed of the movable landing, more than two of the intermediate sprocket wheels will be employed, two only being shown merely to illustrate the principle.

Figs. 10 & 11 illustrate another form of moving landing in which the rollers are turned by gear wheels of varying size and number of cogs so as to give a gradually decreasing rate of speed as the distance from the stairway increases. In this form each sprocket chain on each side initially passes around a large sprocket wheel on the axis of the terminal roller of one group, and is then extended to and around a smaller sprocket wheel on the initial driving roller of the next group. One of these chains is indicated by the numerals 72, the large sprocket wheel around which it passes by the numeral 73, and the small sprocket wheel around which it passes by the numeral 74. Another chain is indicated by the numeral 75, and this passes around a large sprocket wheel 76 on the axis of wheel 74, and said chain is then continued and operates in exactly the same manner as the chain 72. Between the axes of the shafts carrying the sprocket wheels and on the axes of the intermediate rollers are a series of cog wheels, indicated by the numeral 77, and which wheels are mounted on the axis of the rollers, and below these cog wheels 77, and mounted on short shafts 78, are idle cog wheels, two of said wheels being placed on each shaft. One of these cog wheels of a set, indicated by the numeral 79, is preferably provided with five cogs, and the other, indicated by the numeral 80, preferably with six cogs. The arrangement of these cogs on their shafts alternates, that is to say, on one shaft, the wheel having five cogs will be outermost, and the wheel having six cogs will be innermost, while in the case of the next succeeding shaft, the wheel having six cogs will be outermost, and the one having five cogs will be innermost, and so on throughout the series. The shafts of the sprocket wheels 73 & 74 will of course have cog wheels mounted thereon corresponding to the cog wheels 77. If we, therefore, start with the first full line upper cog wheel which is visible in Fig. 11, we find that the cogs of this wheel engage the cogs of the outermost idle cog wheel 79 below, and the cog wheel 80 on the same shaft gears with the next succeeding upper cog wheel 77, while said latter upper cog wheel gears with the outermost six toothed cog wheel below, and the innermost five toothed cog wheel on the same shaft gears with the next succeeding upper cog wheel 77, and so on throughout the series. By this arrangement it will be seen that a gradually reduced speed of the rollers from the stairway is secured. In this form of course one of the rollers must be positively driven by any suitable means, as in the case of the Figs. 8 & 9 form of construction.

In Fig. 5 I have shown the upper surface of the step of the stairway convex. By this arrangement the toe of a person's foot on passing from the moving stairway onto the first small rollers of the movable landing, or vice versa, on passing from the movable landing onto the stairway is so raised as to pass over the first small roller.

In Figs. 12 to 16 another form of movable landing in which the rate of speed is gradually reduced in a direction from the moving stairway is provided. This consists in forming the landing of a number of sections, each section consisting of an endless belt comprising a series of strips hinged together, with roller bearings and openings for the sprockets, and so arranged that each belt moves at a less speed than the adjoining one, as the distance from the moving stairway increases. Referring to these figures, the numerals 81, 81' & 81² indicate the several endless belts. As the construction relative to each endless belt is a duplicate of the other, only the construction relating to one will be explained. Suitable beams 82 are provided, and on these beams are supported rails 83 (three of such rails being shown), and over which the endless belt passes. Journaled at opposite ends of the rails are guide rollers 84, 84 around which the belt passes. Each belt, as stated, is made up of a series of slats, and these slats are hinged together. I show in Fig. 15 the preferred form of hinge, which consists in providing upon the under side of each slat a series of plates 85. One edge of each plate is provided with recesses 86, 86 and an intermediate recess 87. The opposite edge of each plate is provided with projecting tongues 88, 88 and an intermediate recess 89 which registers with the intermediate recess 87 of the adjacent edge of the plate of the next slat. In each recess 89 is a roller 90, the axis of said roller being the hinge pin 91 which passes through the tongues 88, 88, said tongues fitting in the recesses 86, 86 of the plate at the adjacent edge of the adjoining slat. The adjacent edges of the slats are provided with a number of these hinges corresponding to the number of rails 83, three being shown in the present illustration of my invention, and the rollers 90 are so located that as the belt travels around, said rollers will ride on the rails. Journaled in suitable bearings formed by frame pieces 92, 92 are shafts 93, 93'. One of these shafts of the series of belts is positively driven in the same manner as in the preceding constructions of movable landings. On shaft 93, near opposite ends thereof, are toothed wheels 94, 94, which are so located that the teeth thereon, when the wheels revolve, engage with the intermediate recesses 87, and hence cause the belts to travel. Motion is transferred from one belt to another in a manner to cause a gradual decreasing rate of speed as the distance from the stairway increases, by means of two sprocket wheels on each shaft, indicated respectively by the numerals 95 & 96, the sprocket wheel 95 being larger than the wheel 96. A sprocket chain 97 passes around the large sprocket wheel of each shaft to and around the small sprocket wheel of the next succeeding shaft. In this manner, it will be evident that a gradually decreasing rate of speed as the distance from the stairway increases is secured.

In order to prevent a person's toe from passing into the space between the belts, I provide small rollers 98, which fill up said spaces to such an extent as to preclude the possibility of this occurring. It is desirable that these small rollers should rotate only in the direction in which the belt is moving, and in order to secure this I provide a pivoted spring pressed pawl 99 which engages a ratchet wheel 100 on the axis of the roller 98 in such manner as to prevent backward rotation of said roller.

The steps of the movable stairway may be of such size that when the stairway is not moving, said steps may be available for use as a stationary stairway.

What I claim as my invention is;

1. In a movable stairway, the combination of landings, a series of steps, extending from one landing to another, links pivoted to one step of the series and having their opposite ends loosely connected to the next step in advance to permit an independent up and down movement of each step, whereby the horizontal distance from the face of the riser of one step to the face of the riser of the next step will always remain the same whether the step be moving on the level or at an angle, and means for driving the endless stairway.

2. In a movable stairway, the combination of upper and lower tracks extending from one landing to another, and so spaced apart as to set parallel, converging, and diverging, a series of steps, the end pieces thereof provided with openings, roller bearings carried by each step, said roller bearings adapted to engage the respective tracks, guide rollers carried by each step and adapted to bear against the front bordering edge of the end openings of the steps, a series of links each link extending from the axis of the guide rollers of each step and pivoted to the next step to the rear, whereby the series of steps are connected together in the form of an endless stairway, and means for actuating the endless stairway.

3. In a movable stairway, the combination of upper and lower tracks extending from one landing to another and so spaced apart as to set parallel, converging, and diverging, a series of steps, the end pieces thereof provided with openings, roller bearings carried at the upper rear portion of each step and engaging the upper track, roller bearings carried at the lower front portion of each step and engaging the lower track, guide rollers carried by each step and adapted to bear against the front bordering edge of the end openings of the step, other rollers carried on the axes of the guide rollers, said other rollers engaging the upper track, a series of links, each link extending from the axis of the guide rollers of each step and pivoted to the next step to the rear, whereby the series of steps are connected together in the form of an endless stairway, and means for actuating the endless stairway.

4. The combination of a movable stairway extending from one landing to another, wheels provided with peripheral recesses, an endless hand rail extending from one landing to another and around said wheels, and in convenient position to be reached by a person on the movable stairway, said rail provided on its inner side at distances apart with projecting dogs adapted to be engaged by the recesses of the wheels, handles projecting from the outer side of the endless rail, and means for positively driving one of the wheels.

5. The combination of a movable stairway extending from one landing or approach to another, an endless hand rail extending from one landing or approach to another, and in convenient position to be reached by a person standing on the stairway, a series of plates secured to the outer face of the endless hand rail, each plate provided with projecting arms, a pin journaled in said arms, a series of bars each provided at one end with a projecting handle, and having a depending portion or portions mounted on the pin, and said bar also having at its opposite end a slot or opening through which the pin of the next succeeding plate passes, a sheathing or casing for the hand rail, said sheathing or casing having its ends adjacent to the edges of the hand rail, and having its upper portion bent over the hand rail in close proximity thereto, and means for actuating the endless hand rail.

6. In combination with an endless movable carrier, a movable landing or approach to which the carrier leads, and means for moving the upper surface of the landing or approach in the same direction as the moving carrier, and at a rate of speed gradually decreasing as the distance from the carrier increases.

7. In combination with an endless movable carrier, a movable landing or approach to which the carrier leads, said landing or approach consisting of a series of rollers, and means for rotating said rollers in the same direction as the moving carrier and at a rate of speed gradually decreasing as the distance from the carrier increases.

8. In combination with an endless movable carrier, a movable landing or approach to which the carrier leads, said landing or approach consisting of a series of rollers, some of said rollers extending over the movable carrier at the point of turning of said carrier, so that the carrier may pass therebeneath, and a plurality of said rollers from the carrier outwardly being of gradually decreasing diameter, and means for rotating the series of rollers in the same direction as the moving carrier.

9. In combination with an endless movable carrier, a movable landing or approach to which the carrier leads, said landing or approach consisting of a series of rollers, bearings for the axes of said rollers, a series of strips parallel with the bearings and intermediate thereof, the upper edges of said strips provided with recesses in which the rollers are seated, filling blocks interposed between the rollers and supported by said strips, and means for rotating the rollers in the same direction as the moving carrier.

10. In combination with an endless movable carrier, a landing or approach to which said carrier leads, said landing or approach consisting of a series of rollers, sprocket wheels mounted on alternating axes of said rollers, a chain for one group or set of sprocket wheels on one side, said chain passing around two of said sprocket wheels which are a distance apart and engaging the sprocket wheels intermediate thereof, and the opposite chain for the other group or set of sprocket wheels upon the opposite side passing around two of said wheels and engaging the wheels intermediate thereof, the said sprocket wheels so connected and engaged by a chain being of gradually increasing diameter, and means for positively driving one of the rollers.

11. In combination with an endless movable carrier, of a landing or approach to which the carrier leads, said landing or approach consisting of a series of rotatable rollers, and means for rotating said rollers in the same direction as and independently of the moving carrier.

12. An approach to a constantly-moving carrier, including a plurality of forwardly-moving units, constructed and operating in such a manner as to effect the transfer of passengers or freight from one to another.

13. An approach to a constantly-moving conveyer, including a plurality of constantly-moving units, constructed and operating in such a manner as to effect the acceleration of passengers or freight while being transferred from one to another.

14. An approach to a constantly-moving conveyer, including a plurality of forwardly-moving units, constructed and operating in such a manner as to effect the transfer of passengers or freight to the main carrier after accelerating the movement of said passengers or freight.

15. An approach to a moving carrier, including a plurality of units having differing rapidities of forward movement, constructed and operating in such manner as to effect the transfer of passengers or freight to the main carrier.

16. An approach to a moving carrier, including a plurality of units having axes substantially at right angles to the line of movement of the main conveyer, constructed and operating in such manner as to effect the acceleration of passengers or freight resting thereon.

17. An approach to a constantly-moving carrier, including a plurality of forwardly-moving units having differing speeds of movement, constructed and operating in such manner that a passenger's foot normally rests upon a plurality of said units, different ones of the units upon which such foot rests having differing forward speeds.

18. An approach to a constantly-moving carrier, including, (a) means near to a stationary floor or platform, having a movement toward the main carrier but slower than said carrier; (b) means near said main carrier moving in the same direction and having movement of substantially the same speed as the main carrier; and (c) means for automatically accelerating the speed of a passenger or freight in passing between said means first mentioned and said means second mentioned.

19. An approach to a constantly-moving carrier, including (a) means near to a stationary floor or platform, on which means a passenger or freight may rest, said means having a movement toward the main carrier but slower than said carrier; (b) means near said main carrier moving in the same direction and having movement of substantially the same speed as the main carrier; and (c) means for automatically accelerating the speed of said passenger or freight in passing between said means first mentioned and said means second mentioned, said means near the main carrier being constructed and operating to automatically transfer said passenger or freight to said main carrier.

20. An approach to a constantly-moving carrier, having a tread or surface composed of a plurality of disks, wheels or cylinders having axes substantially at right angles to the line of forward movement of the moving carrier, said disks, wheels or cylinders having differing rapidities of peripheral movement.

In testimony whereof, I affix my signature, in presence of two witnesses.

HOWLAND RUSSEL.

Witnesses:
A. L. MORSELL,
ANNA V. FAUST.